United States Patent [19]

Nomura et al.

[11] Patent Number: 5,302,678

[45] Date of Patent: Apr. 12, 1994

[54] CONTACT LENS

[75] Inventors: Masashi Nomura, Kodama; Yuuichi Yokoyama, Kounosu; Hideyuki Futamura, Kamisato; Makoto Tsuchiya, Honjo, all of Japan

[73] Assignee: Hoya Corporation, Tokyo, Japan

[21] Appl. No.: 667,395

[22] PCT Filed: Jul. 31, 1990

[86] PCT No.: PCT/JP90/00973

§ 371 Date: Apr. 6, 1992

§ 102(e) Date: Apr. 6, 1992

[87] PCT Pub. No.: WO91/02279

PCT Pub. Date: Feb. 21, 1991

[30] Foreign Application Priority Data

Jul. 31, 1989 [JP] Japan ................... 1-198417

[51] Int. Cl.$^5$ .................. C08F 18/20; G02C 7/04
[52] U.S. Cl. ................. 526/246; 351/160 H; 523/106
[58] Field of Search ............ 526/246; 351/160 H

[56] References Cited

U.S. PATENT DOCUMENTS 3,394,115  7/1968  Sorkin ........................ 526/246
3,660,360  5/1972  Chaudhuri et al. ............. 526/246
3,920,614  11/1975  Kirimoto et al. .............. 526/246
5,008,354  4/1991  Sawamoto et al. ............. 526/246

FOREIGN PATENT DOCUMENTS 0186033  7/1986  European Pat. Off. .
0213412  3/1987  European Pat. Off. .
0273763  7/1988  European Pat. Off. .
0340636  11/1989  European Pat. Off. .
WO86/04341  7/1986  PCT Int'l Appl. .

OTHER PUBLICATIONS

World Patents Index Latest, Derwent Publications Ltd., London, GB; AN 88-343547 & JP-A-870 093 587 (Kuraray) Oct. 25, 1988, Abstract.

Primary Examiner—Joseph L. Schofer
Assistant Examiner—N. Sarofim
Attorney, Agent, or Firm—Nixon & Vanderhye

[57] ABSTRACT

This invention relates to a contact lens formed of a copolymer containing, as essential components, at least one fluorine-containing monomer and at least one hydrophilic monomer, and the contact lens of this invention has hydrous nature and sufficient oxygen permeability to alleviate a burden which is caused on the cornea when a contact lens is fitted on.

9 Claims, No Drawings

CONTACT LENS

TECHNICAL FIELD OF THE INVENTION

This invention relates to a contact lens, and more specifically to a novel hydrous contact lens having excellent oxygen permeability.

BACKGROUND OF THE INVENTION

Contact lenses generally used at present are broadly classified into a hard contact lens and a soft contact lens.

Concerning the hard contact lens, several types of lenses containing a novel material have been developed in recent years. However, all of such hard contact lenses have a defect in that the fitting sense is poor due to hardness of the material thereof.

On the other hand, as a soft contact lens, a lens produced from a hydrous material containing polyhydroxyethyl methacrylate as a main component is widely used. Since, however, such a soft contact lens has insufficient oxygen permeability and insufficiently supplies the cornea with oxygen, a considerable burden is eventually imposed on the cornea due to oxygen deficiency when the soft contact lens is fitted on for a long period of time.

In order to increase the amount of the oxygen supply to the cornea, therefore, there is employed a means of decreasing the thickness of a contact lens, or a means of increasing the water content of a lens material by using N-vinylpyrrolidone, etc., as a main component. However, these means cause the following problems. When the lens thickness is decreased, the lens form stability decreases, and it becomes difficult to maintain the optical lens function. There is hence a limit to decreasing the lens thickness. When the water content in a lens material is increased, the resultant lens is liable to be soiled, or is liable to be broken due to a decrease in mechanical strength.

In order to overcome the above problems, there has been proposed a hydrous soft contact lens which is produced from a material having oxygen permeability in itself (JP-A-54-29660). The contact lens disclosed in the JP-A-54-29660 is formed essentially of a copolymer of 2-hydroxyethyl methacrylate (to be referred to as HEMA hereinafter) and perfluoroalkylethyl methacrylate (to be referred to as RfMA hereinafter), and this contact lens has attained an oxygen permeability of 500 to 2,708 centibarrels.

Meanwhile, it is well known that with an increase in oxygen supply to the cornea when a contact lens is fitted on, i.e. with an increase in oxygen permeation coefficient of a contact lens, the burden on the cornea is alleviated with regard to metabolism.

In some recent reports on the relationship between an oxygen demand of the cornea when contact lens is fitted on and the oxygen permeation coefficient of a contact lens, the possibility to fit it on extendedly or continuously is discussed. However, no theory has been established on the lowest value of the oxygen permeation coefficient of a contact lens which enables continuous fitting. It is clinically reported that some contact lenses having an oxygen permeation coefficient of $16 \times 10^{-11}$ to $21 \times 10^{-11}$ [$cm^3$ (STP) $cm/(cm^2 \cdot sec \cdot mmHg)$] have been tested on continuous fitting. However, there is also another opinion that the above oxygen permeation coefficient values are too low to fit on a contact lens continuously. Therefore, if it is intended to prevent a hindrance to the cornea metabolism when a contact lens is fitted on, it is considered that a contact lens having an oxygen permeation coefficient of not less than $30 \times 10^{-11}$ [$cm^3$ (STP) $cm/(cm^2 \cdot sec \cdot mmHg)$] greatly reduces a burden which a contact lens would put on the cornea when fitted on.

However, the contact lens disclosed in the above JP-A-54-29660 has an oxygen permeation coefficient of $5 \times 10^{-11}$ to $27 \times 10^{-11}$ [$cm^3$ (STP) $cm/cm^2 \cdot sec \cdot mmHg)$] after the conversion of the data disclosed therein, and it hence cannot be said that a sufficient oxygen permeation coefficient for reducing the burden on the cornea has been attained. That is, the RfMA used as an essential component for the copolymer forming the above contact lens essentially has high hydrophobic nature, and therefore, in order to improve the fitting sense of the lens, it might be attempted to increase the water content of the lens by decreasing the RfMA content and increasing the HEMA content. In this case, however, it is impossible to prevent a decrease in oxygen permeability due to an increase in the HEMA content, and the burden on the cornea increases due to oxygen deficiency. On the other hand, when the oxygen permeability is improved by decreasing the HEMA content and increasing the RfMA content, the resultant contact lens suffers a decrease in its hydrous nature and tends to be fragile.

This invention has been made in order to overcome the above problems, and provides a novel hydrous contact lens. It is an object of this invention to provide a contact lens having hydrous nature and sufficient oxygen permeability to reduce a burden which the contact lens might impose on the cornea when fitted on.

DISCLOSURE OF THE INVENTION

This invention has been made in order to achieve the above object, and provides a contact lens comprising a copolymer obtained by copolymerizing a monomer mixture containing, as essential components, at least one member of fluorine-containing monomers having the general formula,

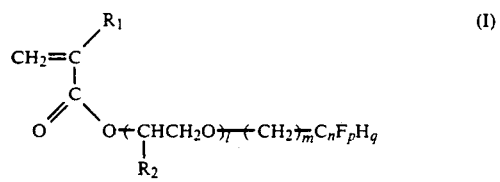

(I)

wherein each of $R_1$ and $R_2$ is independently H or $CH_3$, l is an integer of 1 to 9, m is an integer of 1 to 5, n is an integer of 4 to 10, p is an integer of not less than 8, q is an integer of not less than 0, and p, q and n has the relationship of $p+q=2n+1$, and at least one hydrophilic monomer, and optionally containing other monomer.

PREFERRED EMBODIMENTS OF THE INVENTION

Examples of the fluorine-containing monomer of the above general formula (I) as an essential component for the copolymer constituting the contact lens of this invention are as follows.

MONOMER GROUP (a)

Group of fluorine-containing monomers of the general formula (I) in which $R_2$ is H, said fluorine-containing monomers containing oxyethylene group(s) and having the general formula,

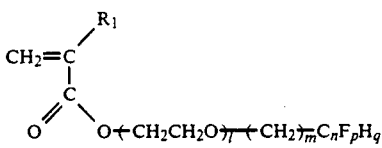

wherein $R_1$, l, m, n, p, q are as defined in the general formula (I)

MONOMER GROUP (b)

Group of fluorine-containing monomers of the general formula (I) in which $R_2$ is $CH_3$, said fluorine-containing monomers containing oxypropylene group(s) and having the general formula,

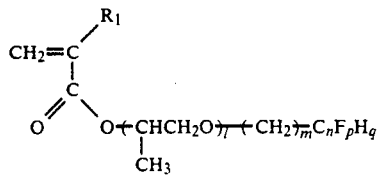

wherein $R_1$, l, m, n, p, q are as defined in the general formula (I).

MONOMER GROUP (c)

Group of fluorine-containing monomers of the general formula (I) in which $R_2$ is a combination of H and $CH_3$, said fluorine-containing monomers containing oxyethyleneoxypropylene group(s) and having the general formula,

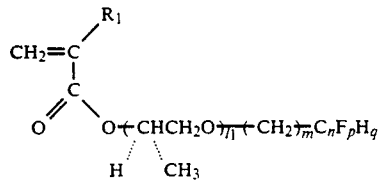

wherein $R_1$, m, n, p, q are as defined in the general formula (I) and $l_1$ is an integer of 2 to 9.

Examples of the group of

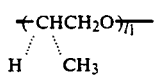

in the above general formula (Ic) can include the following ca, cb and cc:

(ca) An oxyethylene-oxypropylene group in which one oxyethylene group or 2 to 8 oxyethylene groups in a block form bond to the portion of the formula,

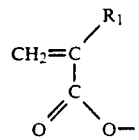

one oxypropylene or 2 to 8 oxypropylene groups in a block form bond to the group of $-(CH_2)_mC_nF_pH_q$, and the total of these groups is 2 to 9.

(cb) An oxyethylene-oxypropylene group in which one oxypropylene group or 2 to 8 oxypropylene groups in a block form bond to the portion of the formula,

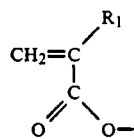

one oxyethylene or 2 to 8 oxyethylene groups in a block form bond to the group of $-(CH_2)_mC_nF_pH_q$, and the total of these groups is 2 to 9.

(cc) An oxyethylene-oxypropylene group in which an oxyethylene group and oxypropylene group intervene at random between the formula of

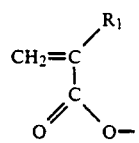

and the formula of $-(CH_2)_mC_nF_pH_q$ such that the total of these groups is 3 to 9.

The fluorine-containing monomer of the general formula (I) and those of the general formulae (Ia), (Ib) and (Ic) subgeneric to the former will be further detailed hereinbelow.

In the above general formulae, the fluorine-containing hydrocarbon of $C_nF_pH_q$ helps to increase the oxygen permeability of a contact lens. The subindex "n" is limited to an integer of 4 to 10. That is because when "n" is an integer of 3 or less and "p" is an integer of 7 or less, the oxygen permeability is insufficient. And, when "n" is an integer of 11 or more, the resultant lens undesirably has fragility. Further, the more the number of fluorine atoms is, the higher the oxygen permeability is. Therefore, the subindex "p" is preferably an integer of 8 or more. The subindex "q" is an integer of not less than 0, and this means that the group of $C_nF_pH_q$ not only may be a perfluoroalkyl group (q=0) but also may be a fluoroalkyl group having one or more H atoms (q=positive integer). And, p+q=2n+1 is only a note of a definition that the group of $C_nF_pH_q$ is a fluorine-containing saturated hydrocarbon devoid of an unsaturated bond. In addition, the group of $C_nF_pH_q$ is preferably linear.

The oxyethylene, oxypropylene or oxyethylene-oxypropylene group of the formula

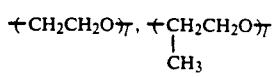

or

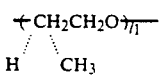

helps to impart the polymer with hydrophilic nature, and also functions to improve the compatibility with a hydrophilic monomer which is the other essential component for the contact lens of this invention.

The number of the above oxyethylene or oxypropylene group, i.e. l, is preferably an integer of 1 to 9.

The reason therefor is as follows: When l is 0, the resultant fluorine-containing monomer shows poor compatibility with the hydrophilic monomer, and it is therefore difficult to obtain a transparent polymer by ordinary bulk polymerization. When l is an integer of 10 or more, it is difficult to obtain a pure monomer since l is distributed when the monomer is synthesized, and it is therefore difficult to obtain a copolymer having stable physical properties. The subindex "l" is preferably an integer of 1 to 5. The number of the oxyethylene-oxypropylene group, i.e. $l_1$ is preferably an integer of 2 to 9. The reason therefor is as follows: When $l_1$ is 1, no oxyethylene-oxypropylene group is constituted. When, $l_1$ is 10 or more, it is also similarly difficult to obtain a copolymer having stable physical properties. The subindex "$l_1$" is preferably an integer of 2 to 5.

The group of $-(CH_2)_m$ in the above general formula is required to be present in order to obviate problems of hydrolysis, etc., which the fluorine-containing monomer might undergo, and to keep the monomer as a stable compound. In order for the monomer to exhibit stability, the subindex "m" is preferably an integer of 1 to 5, more preferably an integer of 1 to 2.

These "l" and "m" are not specially limited to the above, and may be in such a range that the contact lens of this invention can be obtained without impairment.

Specific examples of the fluorine-containing monomer groups of the general formulae (Ia), (Ib) and (Ic) are preferably as follows.

Monomer group (a)

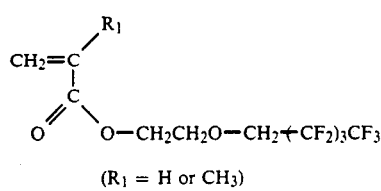
($R_1$ = H or $CH_3$)

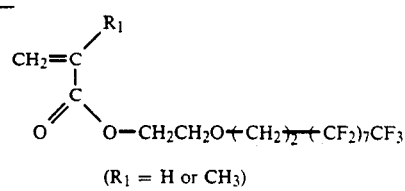
($R_1$ = H or $CH_3$)

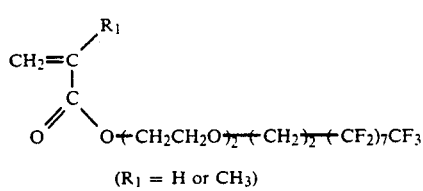
($R_1$ = H or $CH_3$)

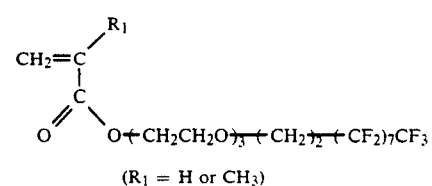
($R_1$ = H or $CH_3$)

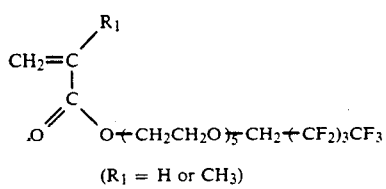
($R_1$ = H or $CH_3$)

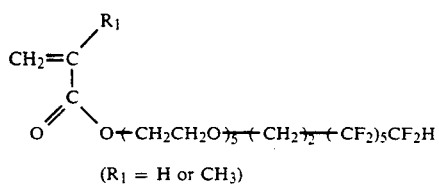
($R_1$ = H or $CH_3$)

Monomer group (b)

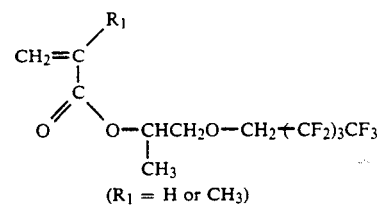
($R_1$ = H or $CH_3$)

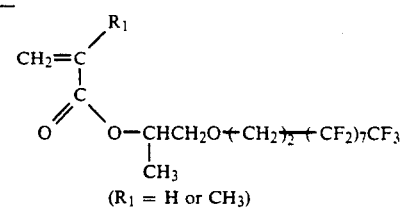
($R_1$ = H or $CH_3$)

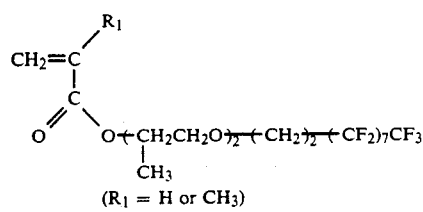
($R_1$ = H or $CH_3$)

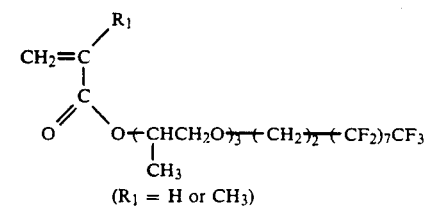
($R_1$ = H or $CH_3$)

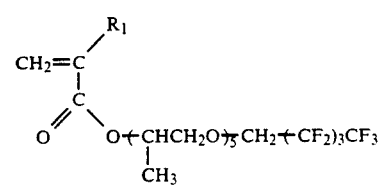
($R_1$ = H or $CH_3$)

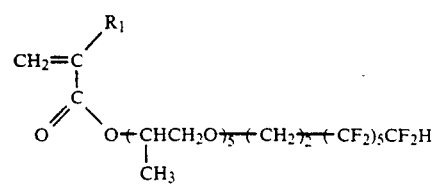
($R_1$ = H or $CH_3$)

-continued
Monomer group (c)

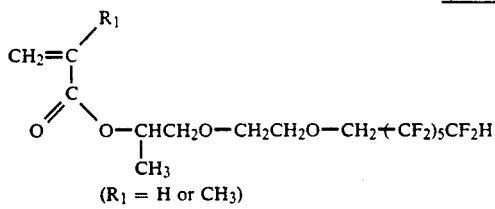
(R₁ = H or CH₃)

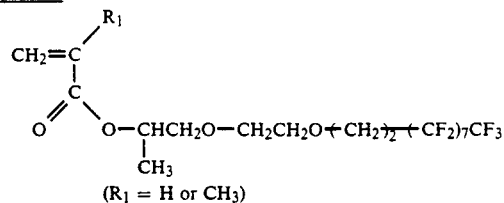
(R₁ = H or CH₃)

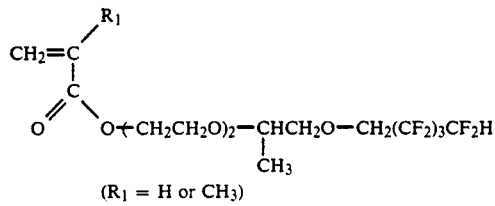
(R₁ = H or CH₃)

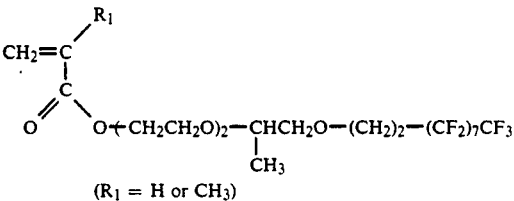
(R₁ = H or CH₃)

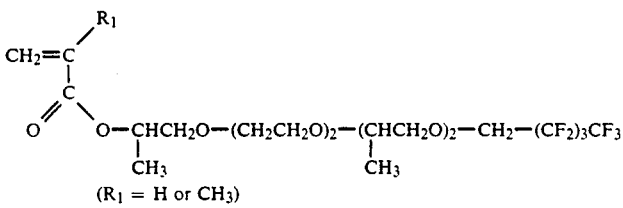
(R₁ = H or CH₃)

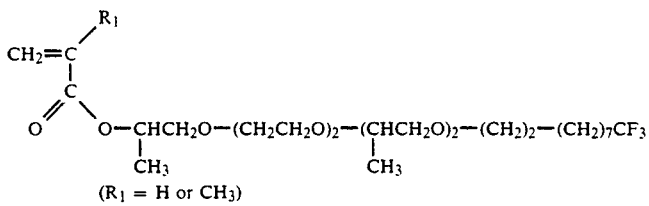
(R₁ = H or CH₃)

The fluorine-containing monomer of the general formula (I) for use in the copolymer constituting the hydrous contact lens of this invention represents at least one monomer selected from the above monomer groups (a), (b) and (c). Specifically, said fluorine-containing monomer represents (i) one monomer selected from the monomer groups (a), (b) and (c), (ii) a combination of at least two monomers selected from one of the monomer groups (a), (b) and (c) [e.g. a combination of two monomers selected from the monomer group (a) alone], or (iii) a combination of at least two monomers selected from at least two different groups of the monomer groups (a), (b) and (c) [e.g. a combination of one monomer selected from the monomer group (a) and one monomer selected from the monomer group (b)].

The amount of the fluorine-containing monomer is preferably 10 to 95 parts by weight (to be referred to as "part" hereinafter). When this amount is less than 10 parts, the desired oxygen permeability cannot be obtained. When it exceeds 95 parts, the hydrous nature cannot be obtained. Said amount is more preferably 20 to 80 parts.

The hydrophilic monomer as other essential component for the copolymer constituting the hydrous contact lens of this invention contributes to obtaining a contact lens imparted with hydrous nature and to improvement in the contact lens fitting sense. This hydrophilic monomer can be selected from, for example, hydroxyalkyl (meth)acrylates [the term "(meth)acrylate" means both acrylate and methacrylate, and will be used in this sense hereinafter] typified by 2-hydroxyethylacrylate (to be referred to as "HEA" hereinafter) and HEMA; N-vinyllactams typified by N-vinylpyrrolidone (to be referred to as "NVP"), N-vinylpiperidone and N-vinylcaprolactam; amide-containing monomers such as N,N-dialkyl(meth)acrylamides typified by N,N-dimethyl(meth)acrylamide and N,N-diethyl(meth)acrylamide and monoalkyl(meth)acrylamide; and unsaturated carboxylic acids having one or not less than two carboxyl groups in the molecule typified by (meth)acrylic acid. At least one monomer of these is used. Of these hydrophilic monomers, particularly preferred are HEMA, HEA, NVP and N,N-dimethylacrylamide (to be referred to as "DMAA"). The amount of the hydrophilic monomer for use in this invention is preferably 5 to 90 parts. When this amount is less than 5 parts, the hydrous nature is undesirably insufficient. When it exceeds 90 parts, there is an undesirable possibility of the resultant copolymer being opaque. Said amount is more preferably 20 to 80 parts. When a bulk polymerization method is employed to obtain a transparent copolymer having suitable hydrous nature and oxygen permeability, the following amounts for some of the above hydrophilic monomers are preferred; HEA: 20-50 parts, HEMA: 20-40 parts, NVP: 20-40 parts and DMAA: 20-80 parts. However, when a monomer composition containing 10 to 50 parts of a compatibilizing diluent such as t-butyl alcohol, butyl cellosolve, or the like is cast-molded, or polymerized in a solution form, instead of carrying out the bulk polymerization, a transparent copolymer can be obtained without limiting the amount of the hydrophilic monomer to the above range.

Concerning the copolymer forming the contact lens of this invention, optional components may be incorporated as required in order to further improve the copolymer in physical properties.

For example, for the purpose of improving the form maintainability of the contact lens, a crosslinking monomer may be incorporated. The crosslinking monomer can be selected, for example, from ethylene glycol di(meth)acrylate, diethylene glycol di(meth)acrylate, triethylene glycol di(meth)acrylate, allyl (meth)acrylate, glycerol di(meth)acrylate, trimethylolpropane tri(meth)acrylate, triallylisocyanurate, 1,4-butanediol di(meth)acrylate, divinylbenzene, etc. These crosslinking monomers may be used alone or in combination. The amount of the crosslinking monomer is preferably 0.01 to 5 parts per 100 parts of the mixture of the fluorine-containing monomer of the above general formula (I) with the hydrophilic monomer. When this amount is less than 0.01 part, the form maintainability of the resultant contact lens is poor. When it exceeds 5 parts, the contact lens undesirability shows degraded flexibility and fragility.

For the purpose of improving the contact lens in mechanical properties, the copolymer may be formed by incorporating alkyl (meth)acrylate such as methyl (meth)acrylate, butyl (meth)acrylate, etc., fluorine-containing alkyl (meth)acrylate, silicone-containing (meth)acrylate, alicyclic or aromatic (meth)acrylate, and the like.

The polymerization method for producing the copolymer forming the contact lens of this invention will be described below. The polymerization may be carried out according to any of known polymerization methods such as a bulk polymerization method, solution polymerization method, etc. Particularly preferred is a bulk polymerization method. As a polymerization initiator, at least one radical generator is generally used for the polymerization. The polymerization initiator can be selected, for example, from azobis compounds such as azobisisobutyronitrile, azobisdimethylvaleronitrile, etc., and peroxides such as benzoyl peroxide. The amount of the polymerization initiator is preferably 0.01 to 3% by weight per 100 parts of the total monomer mixture. For example, the polymerization is carried out by casting the monomer mixture into a casting container made of a metal, glass, plastic, etc., closing the casting container, and elevating the temperature of the monomer mixture stepwise or continuously in a water bath or a hot air dryer. The polymerization temperature range is generally 20° to 150° C., and the polymerization time is about 3 to about 72 hours. The resultant polymerizate or polymer is cooled to room temperature, taken out of the container, and subjected to ordinary machining and polishing to finish it into a contact lens form. Then, the finished lens is hydrated with water, 0.9% physiological saline or an isotonic buffer solution to obtain a hydrous contact lens. The polymerization to obtain the copolymer forming the contact lens of this invention is not limited to the above heat-applied polymerization, and may be carried out by ultraviolet light-applied polymerization or by cast polymerization by which the monomer mixture is formed directly into a contact lens form.

Examples of this invention will be described hereinafter in contrast with Comparative Examples, although this invention shall not be limited to these Examples. Physical property values specified in Examples and Comparative Examples were obtained by the following methods.

OXYGEN PERMEATION COEFFICIENT

A sample having a thickness of 0.2 mm was measured in 0.9% physiological saline having a temperature of 35° C. with a film oxygen transmissometer of Seika type supplied by Rikaseiki Kogyo K.K.

WATER CONTENT

A film-shaped test piece was heated in a 0.9% physiological saline until the test piece was brought into an equilibrium hydration state, and the test piece was measured for a hydrous weight. Then, the test piece was dried and measured for a dry weight, and the water content was calculated on the basis of the following equation.

Water content (%) = [(hydrous weight−dry weight)/hydrous weight] × 100

LIGHT TRANSMITTANCE

The purpose of this measurement is to evaluate the transparency of a polymer. A sample having a thickness of 0.2 mm was measured in a 0.9% physiological saline with a recording spectrophotometer Model 330 Manufactured by Hitachi Ltd.

EXAMPLE 1

80 Parts of perfluorooctylethyloxypropylene methacrylate ("OPMA1" hereinafter), 20 parts of N,N-dimethylacrylamide ("DMAA" hereinafter), 0.5 part of triethylene glycol dimethacrylate ("3G" hereinafter) and 0.2 part of azobisdimethylvaleronitrile ("V65" hereinafter) were mixed, and the resultant monomer mixture was poured into a contact lens-forming mold and polymerized by bulk polymerization. The bulk polymerization was carried out by polymerizing the monomer mixture at 40° C. for 5 hours, elevating the temperature of the polymerization mixture up to 90° C. over 4 hours, and polymerizing it at 90° C. for 5 hours. After cooled, the polymerizate was taken out of the mold, and hydrated by heating it in a 0.9% physiological saline at 80° C. for 6 hours to give a hydrous contact lens.

This hydrous contact lens was measured for physical property values, which measurement showed that it had a water content of as good as 18% and an oxygen permeation coefficient of as good as $34 \times 10^{-11}$[cm$^3$(STP) cm/(cm$^2$·sec·mmHg)].

EXAMPLES 2–40

Various monomers of which the names and amounts are listed in Table 1 were subjected to the same production procedure as that in Example 1, whereby contact lenses were obtained. These lenses were measured for physical properties in the same way as in Example 1. Table 1 shows the results.

EXAMPLE 41

A solution consisting of 55 parts of OPMA1, 45 parts of HEMA, 50 parts of tert-butyl alcohol ("t-BuL" hereinafter) and a benzoin isobutyl ether photosensitive initiator ("BBE" hereinafter) was filtered under reduced pressure to remove gases and suspended particles, and immediately thereafter, poured into a polymerization cell formed of two glass sheets of which the surfaces were fixed with a fluorinated ethylenepropylene polymer film. Radiation from two BL fluorescent lamps was focused to the cell at room temperature for 17 hours, and the resultant alcohol solvation polymer was immersed in a physiological saline at a room temperature and allowed to stand as it was to replace the alcohol with water, whereby a sample for measurement of contact lens properties was obtained. The sample was measured for physical properties in the same way as in Example 1. Table 1 shows the results.

COMPARATIVE EXAMPLE 1

HEMA and RfMA (RfMA means perfluorohexylethyl methacrylate in this Comparative Example, and will be used in this sense hereinafter) of which the amounts are shown in Table 1 were subjected to the same production procedure as that in Example 1, whereby a contact lens was obtained. The contact lens was measured for physical properties. Table 1 shows the results.

COMPARATIVE EXAMPLES 2-3

HEMA and RfMA of which the amounts are shown in Table 1 were mixed with 50 parts of t-BuL and BBE to form a solution, and the solution was subjected to the same production procedure as that in Example 41 to prepare samples. The samples were measured for physical properties, and Table 1 shows the results.

COMPARATIVE EXAMPLE 4

HEMA was subjected to the same production procedure as that in Example 1 to obtain a contact lens (formed of an HEMA homopolymer). Table 1 shows the physical properties thereof.

TABLE 1

| Monomer Composition (part by weight) | Examples | | | | | | | | | |
|---|---|---|---|---|---|---|---|---|---|---|
| | 1 | 2 | 3 | 4 | 5 | 6 | 7 | 8 | 9 | 10 |
| Flourine-containing Monomer | | | | | | | | | | |
| OPMA1 | 80 | 20 | 30 | 55 | | | | | | |
| OPMA2 | | | | | | | | | | |
| OPA1 | | | | | 80 | 20 | | | | |
| OPA2 | | | | | | | | | | |
| OEMA1 | | | | | | | 40 | 20 | | |
| OEMA2 | | | | | | | | | | |
| OEA1 | | | | | | | | | 80 | 20 |
| OEA2 | | | | | | | | | | |
| RfMA(*1) | | | | | | | | | | |
| Hydrophilic Monomer | | | | | | | | | | |
| DMAA | 20 | 80 | | | 20 | 80 | 60 | 80 | 20 | 80 |
| NVP | | | | | | | | | | |
| HEMA | | | | | | | | | | |
| HEA | | | 20 | 45 | | | | | | |
| Crosslinking Monomer | | | | | | | | | | |
| 1G | | | | | | | | | | |
| 3G | 0.5 | 0.5 | 0.5 | 0.5 | 0.5 | 0.5 | 0.5 | 0.5 | 0.5 | 0.5 |
| Other Monomer | | | | | | | | | | |
| Physical Properties | | | | | | | | | | |
| Water content (%) | 18 | 76 | 2 | 2 | 17 | 80 | 62 | 76 | 18 | 76 |
| Oxygen permeation coefficient (*2) | 34 | 35 | 45 | 43 | 51 | 45 | 40 | 44 | 41 | 37 |
| Visible light transmittance (%) | >90 | >90 | >90 | >90 | >90 | >90 | >90 | >90 | >90 | >90 |

| Monomer Composition (part by weight) | Examples | | | | | | | | | |
|---|---|---|---|---|---|---|---|---|---|---|
| | 11 | 12 | 13 | 14 | 15 | 16 | 17 | 18 | 19 | 20 |
| Fluorine-containing Monomer | | | | | | | | | | |
| OPMA1 | | | | | | | | | | 70 |
| OPMA2 | | | | | 70 | | | | | |
| OPA1 | 80 | | | | | | | | 60 | |
| OPA2 | | | | | | 40 | | | | |
| OEMA1 | | 80 | 80 | | | | | | | |
| OEMA2 | | | | | | | 80 | | | |
| OEA1 | | | | 80 | | | | | | |
| OEA2 | | | | | | | | 80 | | |
| RfMA(*1) | | | | | | | | | | |
| Hydrophilic Monomer | | | | | | | | | | |
| DMAA | | | | | 30 | 60 | 20 | | 20 | 30 |
| NVP | 20 | | | | | | | | | |
| HEMA | | 20 | | | | | | | | |
| HEA | | | 20 | 20 | | | | 20 | | |
| Crosslinking Monomer | | | | | | | | | | |
| 1G | 0.5 | | | 0.5 | | | | | | |
| 3G | | 0.5 | 0.5 | | 0.5 | 0.5 | 0.5 | 0.5 | 1.0 | 0.5 |
| Other Monomer | | | | | | | | | MMA 20 | |
| Physical Properties | | | | | | | | | | |
| Water content (%) | 12 | 5 | 6 | 8 | 27 | 60 | 20 | 8 | 17 | 28 |

TABLE 1-continued

| | | | | | | | | | | |
|---|---|---|---|---|---|---|---|---|---|---|
| Oxygen permeation coefficient (*2) | 52 | 33 | 60 | 50 | 30 | 40 | 30 | 60 | 35 | 32 |
| Visible light transmittance (%) | >90 | >90 | >90 | >90 | >90 | >90 | >90 | >90 | >90 | >90 |

| Monomer Composition (part by weight) | Examples | | | | | | | | | |
|---|---|---|---|---|---|---|---|---|---|---|
| | 21 | 22 | 23 | 24 | 25 | 26 | 27 | 28 | 29 | 30 |
| Fluorine-containing Monomer | | | | | | | | | | |
| OPMA1 | 40 | | | | 70 | | 70 | 95 | 70 | 60 |
| OPMA2 | | | | | | | | | | |
| OPA1 | | 60 | 60 | 40 | | | | | | |
| OPA2 | | | | | | | | | | |
| OEMA1 | | | | | | 30 | | | | |
| OEMA2 | | | | | | | | | | |
| OEA1 | | | | | | | | | | |
| OEA2 | | | | | | | | | | |
| RfMA(*1) | | | | | | | | | | |
| Hydrophilic Monomer | | | | | | | | | | |
| DMAA | 60 | 40 | 40 | 60 | | 70 | | 5 | 30 | 20 |
| NVP | | | | | | | | | | |
| HEMA | | | | | | | 30 | | | |
| HEA | | | | | 30 | | | | | |
| Crosslinking Monomer | | | | | | | | | | |
| 1G | | | 0.5 | | | | | | 0.2 | 0.2 |
| 3G | 0.5 | 0.5 | | 0.5 | 4 | 0.02 | | 0.5 | | |
| Other Monomer | | | | | | | | | | BuA 20 |
| Physical Properties | | | | | | | | | | |
| Water content (%) | 61 | 39 | 38 | 60 | 3 | 70 | 9 | 4 | 25 | 19 |
| Oxygen permeation coefficient (*2) | 31 | 42 | 40 | 40 | 57 | 38 | 30 | 31 | 30 | 33 |
| Visible light transmittance (%) | >90 | >90 | >90 | >90 | >90 | >90 | >90 | >90 | >90 | >90 |

| Monomer Composition (part by weight) | Examples | | | | | | | | |
|---|---|---|---|---|---|---|---|---|---|
| | 31 | 32 | 33 | 34 | 35 | 36 | 37 | 38 | 39 |
| Fluorine-containing Monomer | | | | | | | | | |
| OPMA1 | 40 | | | | | | | 68 | 70 |
| OPMA2 | | | | | | | | | |
| OPA1 | | 50 | | | | | 68 | | |
| OPA2 | | | | | | | | 40 | |
| OEMA1 | | | 70 | | | | | | |
| OEMA2 | | | | | | | | | |
| OEA1 | | | | 68 | 68 | | | | |
| OEA2 | | | | | | | | | |
| RfMA(*1) | | | | | | | | | |
| Hydrophilic Monomer | | | | | | | | | |
| DMAA | 20 | 30 | 30 | 32 | | 20 | 20 | 55 | 25 |
| NVP | | | | | 32 | | | | |
| HEMA | | | | | | | | | |
| HEA | | | | | | | | | |
| Crosslinking Monomer | | | | | | | | | |
| 1G | 0.2 | 0.2 | 0.2 | 0.5 | | | 0.2 | 0.2 | 0.2 |
| 3G | | | | | 0.5 | 0.5 | | | |
| Other Monomer | BuA 20 | 3FE 20 | | | | MMA 12 | TSM 12 | 3FE 5 | TSM 5 |
| Physical Properties | | | | | | | | | |
| Water content (%) | 20 | 25 | 14 | 27 | 23 | 17 | 16 | 52 | 23 |
| Oxygen permeation coefficient (*2) | 30 | 31 | 30 | 36 | 38 | 35 | 32 | 32 | 30 |
| Visible light transmittance (%) | >90 | >90 | >90 | >90 | >90 | >90 | >90 | >90 | >90 |

| Monomer Composition (part by weight) | Examples | | Comparative Examples | | | |
|---|---|---|---|---|---|---|
| | 40 | 41 | 1 | 2 | 3 | 4 |
| Fluorine-containing Monomer | | | | | | |
| OPMA1 | | 55 | | | | |
| OPMA2 | 35 | | | | | |
| OPA1 | | | | | | |
| OPA2 | | | | | | |
| OEMA1 | | | | | | |
| OEMA2 | | | | | | |

TABLE 1-continued

| | | | | | | |
|---|---|---|---|---|---|---|
| OEA1 | | | | | | |
| OEA2 | | | | | | |
| RfMA(*1) | | 70 | 80 | 20 | | |
| Hydrophilic Monomer | | | | | | |
| DMAA | 50 | | | | | |
| NVP | | | | | | |
| HEMA | | 45 | 30 | 20 | 80 | 100 |
| HEA | | | | | | |
| Crosslinking Monomer | | | | | | |
| 1G | | | | | | |
| 3G | 0.5 | | | | | |
| Other Monomer | TSM 15 | | | | | |
| Physical Properties | | | | | | |
| Water content (%) | 48 | 14 | 5 | 2 | 34 | 38 |
| Oxygen permeation coefficient (*2) | 30 | 31 | 25 | 28 | 8 | 7 |
| Visible light transmittance (%) | >90 | >90 | opaque | >90 | >90 | >90 |

(*1) Conventional fluorine-containing monomer
(*2) $\times 10^{-11}$ [cm$^3$(STP)cm/(cm$^2$ · sec · mmHg)]

The abbreviations in Table 1 stand for the following compounds.

$$CH_2=C(CH_3)-C(=O)-O-CH(CH_3)CH_2O-CH_2CH_2-(CF_2)_7CF_3 \quad \text{OPMA1}$$

$$CH_2=C(CH_3)-C(=O)-O+CH(CH_3)CH_2O+_2CH_2CH_2-(CF_2)_7CF_3 \quad \text{OPMA2}$$

$$CH_2=CH-C(=O)-O-CH(CH_3)CH_2O-CH_2CH_2-(CF_2)_7CF_3 \quad \text{OPA1}$$

$$CH_2=CH-C(=O)-O-(CH(CH_3)CH_2O)_2-CH_2CH_2-(CF_2)_7CF_3 \quad \text{OPA2}$$

$$CH_2=C(CH_3)-C(=O)-O-CH_2CH_2O-CH_2CH_2-(CF_2)_7CF_3 \quad \text{OEMA1}$$

$$CH_2=C(CH_3)-C(=O)-O-(CH_2CH_2O)_2-CH_2CH_2-(CF_2)_7CF_3 \quad \text{OEMA2}$$

$$CH_2=CH-C(=O)-O-CH_2CH_2O-CH_2CH_2-(CF_2)_7CF_3 \quad \text{OEA1}$$

$$CH_2=CH-C(=O)-O-(CH_2CH_2O)_2CH_2CH_2-(CF_2)_7CF_3 \quad \text{OEA2}$$

RfMA: Perfluoroalkylethyl methacrylate (Perfluorohexylethyl methacrylate was used.)
DMAA: N,N-Demethylacrylamide
NVP: N-Vinylpyrrolidone
HEMA: 2-Hydroxyethyl methacrylate
HEA: 2-Hydroxyethyl acrylate
1G: Ethylene glycol dimethacrylate
3G: Triethylene glycol dimethacrylate
MMA: Methyl methacrylate
BuA: Butyl acrylate
3FE: 2,2,2-Trifluoroethyl methacrylate
TSM: Tris(trimethylsiloxy)silylpropyl methacrylate As is clearly shown in Table 1, the contact lens formed of a homopolymer of HEMA, obtained in Comparative Example 4, exhibited a considerably lower oxygen permeation coefficient than the contact lenses obtained in the other Examples. Further, with regard to contact lenses formed of a RfMA/HEMA copolymer, the contact lens produced by an ordinary bulk polymerization method in Comparative Example 1 was opacified and became no transparent one, and the contact lenses produced by incorporating t-BuL, obtained in Comparative Examples 2 and 3, failed to satisfy any of the requirements of the water content and oxygen permeation coefficient.

In contrast, each of the contact lenses obtained in Examples 1 to 40 was satisfactory both in the water content and oxygen permeation coefficient, and further, these contact lenses had sufficient transparency.

Moreover, the contact lens obtained in Example 41 was transparent due to the incorporation of t-BuL although it had a large content of HEMA, and it had a sufficient water content and oxygen permeation coefficient.

As described above, the contact lens of this invention is a transparent copolymer which can be obtained even by bulk polymerization, and it has hydrous nature and excellent oxygen permeability.

These excellent properties can be achieved only when the novel fluorine-containing monomer and the hydrophilic monomer are used as essential components of the polymer, and constitute effects characteristic of this invention.

What is claimed is:

1. A hydrous contact lens comprising a copolymer obtained by copolymerizing a monomer mixture containing, as essential components, at least one member of fluorine-containing monomers having the general formula,

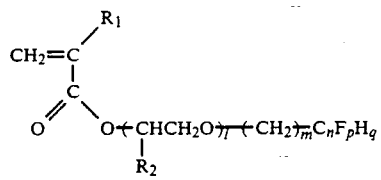
(I)

wherein each of $R_1$ and $R_2$ is independently H or $CH_3$, $l$ is an integer of 1 to 9, m is an integer of 1 to 5, n is an integer of 4 to 10, p is an integer of not less than 8, q is an integer of not less than 0, and p, q and n has the relationship of $p+q=2n+1$, and at least one hydrophilic monomer, and optionally, containing other monomer.

2. A hydrous contact lens according to claim 1, wherein the fluorine-containing monomers have the general formula (I) in which $R_2$ is H, said fluorine-containing monomers containing oxyethylene group(s) and having the general formula,

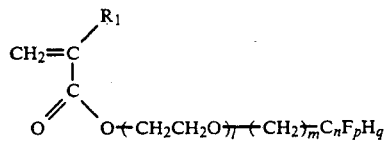
(Ia)

wherein $R_1$, $l$, m, n, p, q are as defined in the general formula (I).

3. A hydrous contact lens according to claim 1, wherein the fluorine-containing monomers have the general formula (I) in which $R_2$ is $CH_3$, said fluorine-containing monomers containing oxypropylene group(s) and having the general formula,

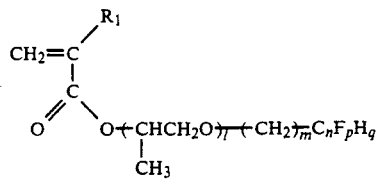
(Ib)

wherein $R_1$, $l$, m, n, p, q are as defined in the general formula (I).

4. A hydrous contact lens according to claim 1, wherein the fluorine-containing monomers have the general formula (I) in which $R_2$ is a combination of H and $CH_3$, said fluorine-containing monomers containing oxyethylene-oxypropylene group(s) and having the general formula,

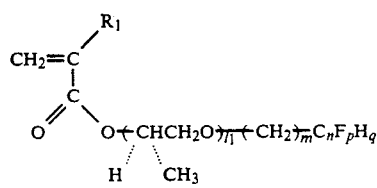
(Ic)

wherein $R_1$, m, n, p, q are as defined in the general formula (I) and $l_1$ is an integer of 2 to 9.

5. A hydrous contact lens according to claim 1, wherein the hydrophilic monomer is selected from the group consisting of hydroxyalkyl (meth)acrylates, N-vinylpyrrolidone, N-vinylpiperidone, N-vinyllactams, amide group-containing monomers and unsaturated carboxylic acids.

6. A hydrous contact lens according to claim 1, wherein the other optional monomer is a crosslinking monomer.

7. A hydrous contact lens according to claim 1, wherein the other optional monomer is at least one member selected from the group consisting of alkyl (meth)acrylate, fluorine-containing alkyl (meth)acrylate, silicone-containing (meth)acrylate and alicyclic or aromatic (meth)acrylate.

8. A composition for use in a hydrous contact lens, which comprises a monomer mixture containing, as essential components, at least one member of fluorine-containing monomers having the general formula,

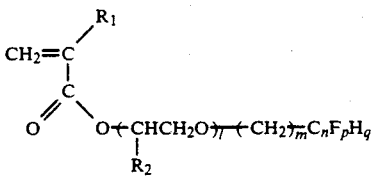
(I)

wherein each of $R_1$ and $R_2$ is independently H or $CH_3$, $l$ is an integer of 1 to 9, m is an integer of 1 to 5, n is an integer of 4 to 10, p is an integer of not less than 8, q is an integer of not less than 0, and p, q and n has the relationship of $p+q=2n+1$, and at least one hydrophilic monomer, and optionally, containing other monomer.

9. A hydrous contact lens according to claim 1 having an oxygen permeation coefficient of about 30 to about 60 and a water content in the range of about 2% to about 28%.

* * * * *